J. B. SECOR.

Toy Pistol.

No. 9,436. Reissued Oct. 26, 1880.

Witnesses:-

Louis M. Whitehead.

Fred K. Haynes

Inventor:-

Jerome B. Secor by his Attorneys

Brown & Brown

N. PETERS, PHOTO-LITHOGRAPHER, WASHINGTON, D. C.

UNITED STATES PATENT OFFICE.

JEROME B. SECOR, OF BRIDGEPORT, CONNECTICUT.

TOY PISTOL.

SPECIFICATION forming part of Reissued Letters Patent No. 9,436, dated October 26, 1880.

Original No. 226,361, dated April 6, 1880. Application for reissue filed May 22, 1880.

*To all whom it may concern:*

Be it known that I, JEROME B. SECOR, of Bridgeport, Fairfield county, Connecticut, have invented an Improved Toy Pistol, of which the following is a specification.

My invention is a pistol intended chiefly as a toy, constructed so as to facilitate and cheapen the manufacture, lock the barrel in position without the use of springs or catches, and prevent the use of the pistol, when intended as a toy, for discharging ball-cartridges.

My invention consists in the combination, in a toy fire-arm, with a handle and stock composed of two longitudinal parts, forming together the sides, front, and back thereof, and having cast in the same piece with them two cheeks, between which is an opening at the top and front, of a tilting barrel, said cheeks being made to gripe the breech portion or rear end of said barrel tightly between them, and serving, without other means operating independently thereof, to retain it in its normal position, while yet permitting of its withdrawal beyond them for the purpose of tilting the barrel. I also preferably form in the same pieces with the two cheeks lips which project toward one another, and which prevent the barrel from being turned down to close the breech when a cartridge projects beyond the end thereof.

My invention also consists in combinations of parts hereinafter described and claimed.

Figure 1:
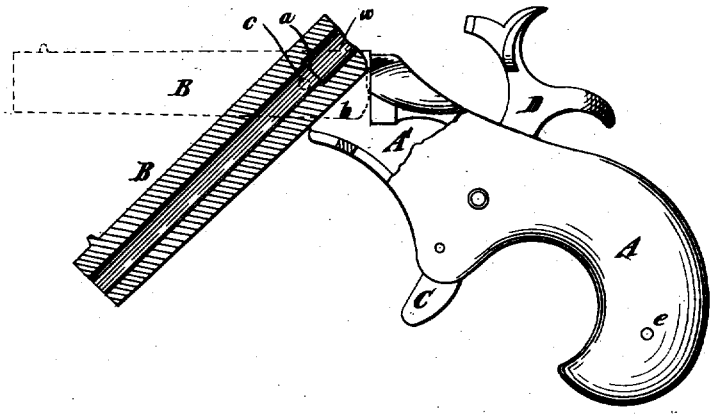
Figure 2:
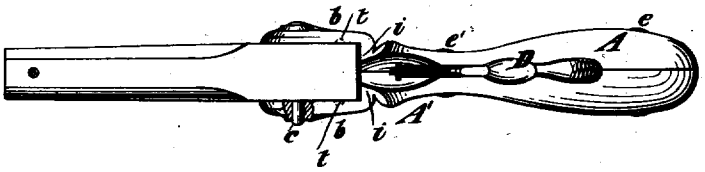
Figure 3:
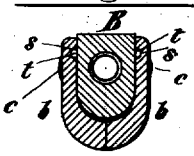

In the drawings forming part of this specification, Figure 1 is a side view, partly in section, of my improved pistol. Fig. 2 is a plan view; Fig. 3, a cross-section.

A represents the handle; A′, the stock; B, the barrel; C, the trigger, and D the hammer.

The pistol is a breech-loader, the barrel B being pivoted by trunnions *c*, extending from opposite sides through holes in two cheeks or sections, *b b′*, extending from and formed with the stock A.

As clearly shown in Fig. 2, the handle A and stock A′ are composed of two longitudinal parts, forming together the sides, front, and back thereof, and the cheeks *b b′* have an opening between them at the front and top for the breech end of the barrel. These cheeks are cast in the same pieces with the two longitudinal parts forming the handle and stock.

The cheeks *b b′* serve, without any means operating independently of them, to hold the barrel in its normal position and still afford provision for its withdrawal beyond them for the purpose of tilting the barrel.

To prevent accidents from discharging ball-cartridges, the bore of the barrel is of such increased width at the breech as to form a chamber, *w*, to receive the cylinder of the cartridge; but this chamber is only as long as said cylinder, the shoulder *a*, formed by contracting the bore in front of the chamber, preventing the passage of a ball, so that a blank cartridge may be inserted in the chamber, but a ball-cartridge can only be introduced a part of its length.

Lips *i i* on the stock A′ are so arranged that the barrel cannot be turned down as long as the cartridge projects beyond the end. Thus, when a ball-cartridge is pushed into the chamber, the barrel cannot be turned to a position in which the hammer can strike and explode the charge.

To provide for retaining the barrel in its normal position for firing, its breech end is so constituted and combined with the cheeks *b b′* that the barrel will maintain such position when adjusted thereinto. The said breech end of the barrel is shown as fitting tightly between the cheeks, and as griped by or otherwise engaging therewith, so as to be held thereby.

I have shown recesses *s s* in the inner faces of the cheeks *b b′*, adapted to lugs *t t* on the barrel when the latter is in its normal position. The side pieces of the stock, from which the cheeks extend, are secured by rivets *e e′*, the latter being at such a distance from the cheeks that the cheeks in front of the rivet *e′* can spring slightly apart to permit the lugs *t t* to pass into and from the recesses *s s*.

According to my invention the barrel will be held in place without interfering with its adjustment when sufficient power is applied to turn it.

It will be apparent that the recesses may be made in the barrel and the lugs on the cheeks *b b′*, and that this construction may be employed in pistols intended for ball-cartridges.

It will be seen that the breech-loading pistol thus constructed consists of but six parts, including the hammer-spring (not shown) and the two cast rivets, that the barrel may be retained in place, and that the toy cannot be converted into a dangerous weapon.

I do not claim as new a tilting barrel retained in horizontal position by a spring-catch.

What I claim as my invention, and desire to secure by Letters Patent, is—

1. The combination, in a toy fire-arm, with a handle and stock composed of two longitudinal parts, forming together the sides, front, and back thereof, and having cast in the same piece with them two cheeks, between which is an opening at the top and front, of a tilting barrel, said cheeks being made to tightly gripe the breech portion or rear end of said barrel between them, and serving, without other means operating independently thereof, to retain it in its normal position, while yet permitting of its withdrawal beyond them for the purpose of tilting the barrel, substantially as specified.

2. The combination, in a toy fire-arm, with a handle and stock composed of two longitudinal parts, forming together the sides, front, and back thereof, and having cast in the same piece with them two cheeks, between which is an opening at the top and front, and lips formed in the same piece with said cheeks and projecting toward one another at the back, of a tilting barrel, said cheeks being made to gripe the breech portion or rear end of said barrel tightly between them, and serving, without other means operating independently thereof, to retain it in its normal position, while yet permitting of its withdrawal beyond them for the purpose of tilting the barrel, substantially as specified.

3. The combination of a tilting barrel, B, pivoted by trunnions, and a stock, A′, having cheeks adapted to receive said trunnions and to spring apart to release and fasten the barrel in its tilting movement, the respective parts being provided with holding-lugs and recesses *s t*, as herein specified.

4. The combination, in a toy pistol, of a stock, A′, in two spring-sections, *b b′*, united by rivets *e e′* at and in rear of the hammer, and constructed with lips *i i*, and a tilting barrel, B, pivoted by trunnions *c*, and having a breech-chamber, *w*, the respective parts being provided with holding-lugs and recesses *s t*, as herein set forth.

J. B. SECOR.

Witnesses:
DAVID B. LOCKWOOD,
ADORNO A. WHITMAN.